(12) United States Patent
Grover et al.

(10) Patent No.: US 8,320,371 B2
(45) Date of Patent: Nov. 27, 2012

(54) STATISTICS BASED FORWARDING INFORMATION BASE REPOPULATION

(75) Inventors: Hasmit Grover, Fremont, CA (US); Tony Speakman, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 558 days.

(21) Appl. No.: 11/977,762

(22) Filed: Oct. 26, 2007

(65) Prior Publication Data

US 2009/0109852 A1    Apr. 30, 2009

(51) Int. Cl.
*H04L 12/56* (2006.01)
(52) U.S. Cl. .................... 370/389; 370/392; 370/351
(58) Field of Classification Search .............. 370/389, 370/392.351, 395.2
See application file for complete search history.

(56) References Cited

U.S. PATENT DOCUMENTS

| | | | |
|---|---|---|---|
| 5,331,635 A * | 7/1994 | Ota | 370/401 |
| 6,631,478 B1 * | 10/2003 | Wang et al. | 714/15 |
| 7,515,525 B2 * | 4/2009 | Appanna et al. | 370/217 |
| 2002/0078196 A1 * | 6/2002 | Kim et al. | 709/224 |
| 2004/0006640 A1 * | 1/2004 | Inderieden et al. | 709/242 |
| 2005/0105905 A1 * | 5/2005 | Ovadia et al. | 398/47 |
| 2006/0153200 A1 * | 7/2006 | Filsfils et al. | 370/395.31 |
| 2006/0233156 A1 * | 10/2006 | Sugai et al. | 370/351 |
| 2007/0097973 A1 * | 5/2007 | Scudder et al. | 370/392 |
| 2008/0279183 A1 * | 11/2008 | Wiley et al. | 370/389 |
| 2008/0310340 A1 * | 12/2008 | Isozu | 370/328 |

OTHER PUBLICATIONS

G. Trotter, "Terminology for Forwarding Information Base (FIB) based Router Performance", IETF RFC 3222, Dec. 2001.
Ambrose et al.,"Terminology for Router Protocol Testing", IETF draft-ambrose-routing-protocol-term-00.txt, Jun. 2001.

* cited by examiner

*Primary Examiner* — Robert Wilson
*Assistant Examiner* — Pamit Kaur
(74) *Attorney, Agent, or Firm* — Cindy Kaplan

(57) ABSTRACT

A method and apparatus for repopulating a forwarding information base at a network device are disclosed. In one embodiment, the apparatus includes a routing information base, forwarding information base, memory for storing performance data based on packets forwarded from the network device, and a processor configured to prioritize routes stored in the routing information base based on the performance data, propagate the routes from the routing information base to the forwarding information base in an order based at least in part on the route priorities.

18 Claims, 4 Drawing Sheets

STATISTICS BASED FORWARDING INFORMATION BASE REPOPULATION

BACKGROUND OF THE INVENTION

The present disclosure relates generally to populating a database with information used to forward packets in a computer network.

A network device such as a router or switch receives, processes, and forwards or discards data packets based on information contained in the packet. Processing of control packets leads to the construction of a routing information base (RIB). The routing information base is a memory structure that contains routing data. Entries in the RIB are used to populate a forwarding information base (FIB), which is a database of information used to forward packets. When a data packet is received on a routed interface, the router looks up the destination in the FIB to find the next hop for the packet.

Any number of events may result in entries of a forwarding information base being cleared or becoming stale. For example, one or more components of the router may be rebooted, clearing stored routes or a secondary processor may come online to take over for a failed primary processor, in which case the existing entries may be considered stale. In order for the router to repopulate the FIB, the router first needs to process received routing protocol packets, build the RIB, select the best paths, and then use this information to repopulate the FIB. If a route is repopulated in the FIB before receiving a data packet associated with the route, forwarding for that packet or any packet with an associated prefix is essentially unaffected. Therefore, the order in which the FIB is repopulated can have a significant impact on the degree of service degradation caused by the failure or reboot at the network device.

DESCRIPTION OF EXAMPLE EMBODIMENTS

Overview

A method and apparatus for repopulating a forwarding information base at a network device are disclosed.

In one embodiment, a method generally comprises collecting performance data based on packets forwarded from the network device, prioritizing routes in a routing information base based on the collected performance data, and propagating the routes to the forwarding information base in an order based at least in part on the prioritization of the routes.

In another embodiment, an apparatus generally comprises a routing information base, forwarding information base, memory for storing performance data based on packets forwarded from the network device, and a processor configured to prioritize routes stored in the routing information base based on the performance data, propagate the routes from the routing information base to the forwarding information base in an order based at least in part on the route priorities.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and apparatus disclosed herein are used to repopulate a forwarding information base (FIB). As described below, route priority is determined based on performance statistics and used to prioritize the order of repopulation of the FIB to reduce misforwarding errors following an event that clears or stales entries in the FIB.

Figure 1:
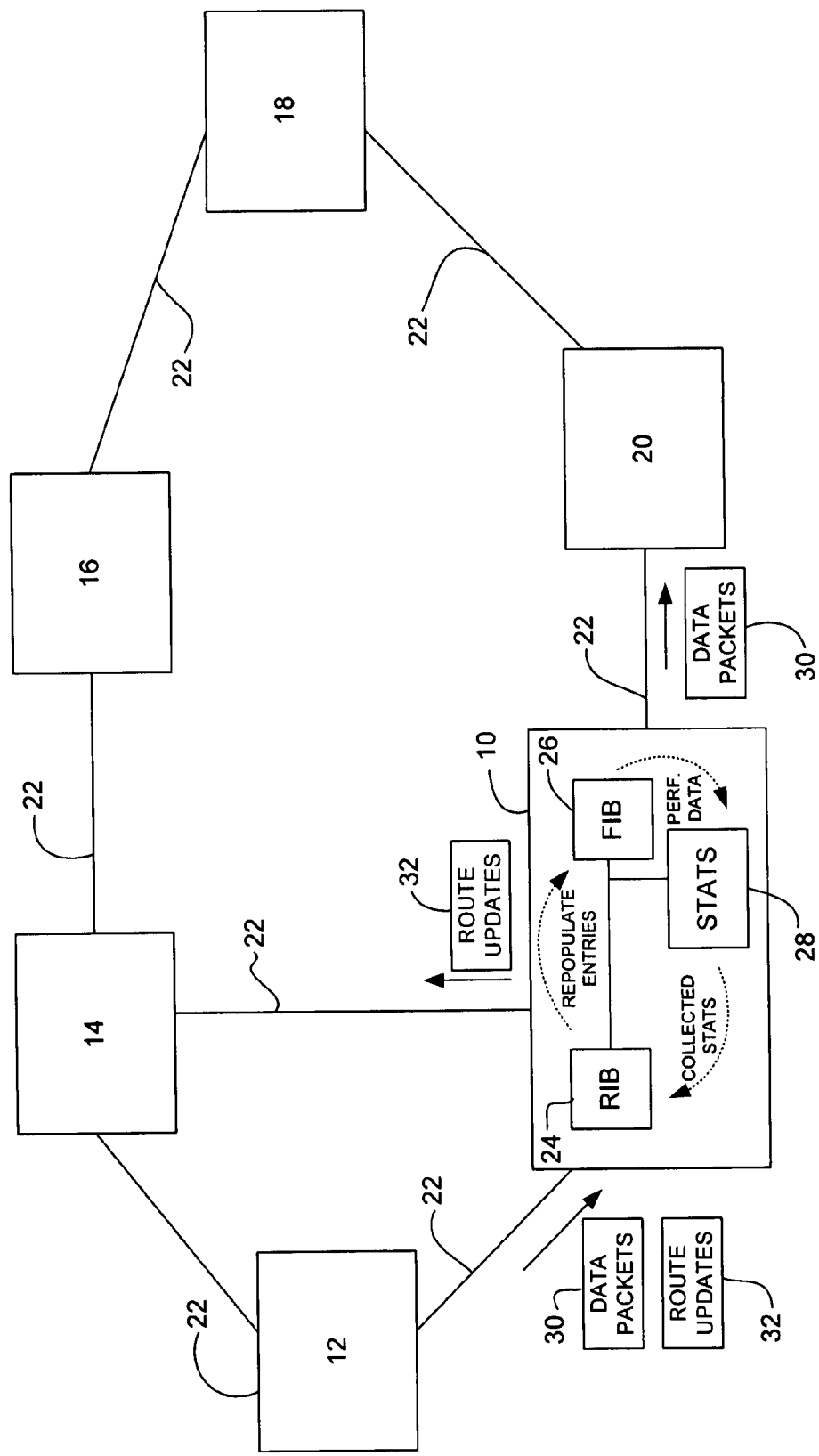
FIG. 1 illustrates an example of a network in which embodiments described herein may be implemented.

Referring now to the drawings, and first to FIG. 1, an example of a network in which the embodiments described herein may be implemented is shown. The network includes a plurality of network devices 10, 12, 14, 16, 18, 20 interconnected by communication links 22. The network device may be a router, switch, gateway, or other device configured to route packets in the network. For simplification only details of network device 10 are shown in FIG. 1. One or more of the other network devices 12, 14, 16, 18, 20 may also be configured to implement the repopulation prioritization method and system described herein.

As shown in FIG. 1, network device 10 includes a routing information base (RIB) 24 and forwarding information base (FIB) 26. The forwarding information base 26 is distinct from the routing information base 24, which holds all routing information received from routing protocols. The routing information base 24 comprises a table of entries that identify a destination, next-hop, and a routing metric (e.g., administrative distance). The routing information base 24 may contain information about more than one next-hop to the same destination if it is important to have the ability to send packets over different paths. A selection algorithm uses the information contained in the routing information base to choose the best actual routes (next-hops). Entries in the RIB 24 are used to populate the forwarding information base 26, as described below.

The forwarding information base 26 is populated and maintained by the RIB 24. As described in detail below, the RIB 24 selects an order to repopulate an empty FIB 26 based at least in part on collected performance statistics 28. The forwarding information base 26 is used in the selection of an outgoing interface for each packet 30 that arrives on an incoming interface. The forwarding information base 26 consists of FIB entries which include information required to make a forwarding decision on a particular packet. The entry may contain, for example an interface identifier and next-hop information for each reachable destination network prefix. The next-hop is routing protocol specific (e.g., for IP next-hop may be an IP address or for MPLS an outgoing interface and label). The FIB 26 typically contains unique paths (i.e., best-route-only). When a packet is received on a routed interface, the router looks up the destination in the FIB to find the next-hop for the packet. If a lookup at the FIB 26 is unsuccessful, the router resolves the destination next-hop using the RIB 24.

As shown in FIG. 1, router 10 receives and processes packets 30, 32. The network device forwards the data packets 30 based on one or more criteria, including, for example, the type of protocol used by the packet, addresses of the packet, and type of quality of service requested. Router 10 also receives and sends routing information in route updates (routing protocol messages) 32. The information received in the route updates 32 is used to create or update entries in the routing information base 24.

Figure 2:
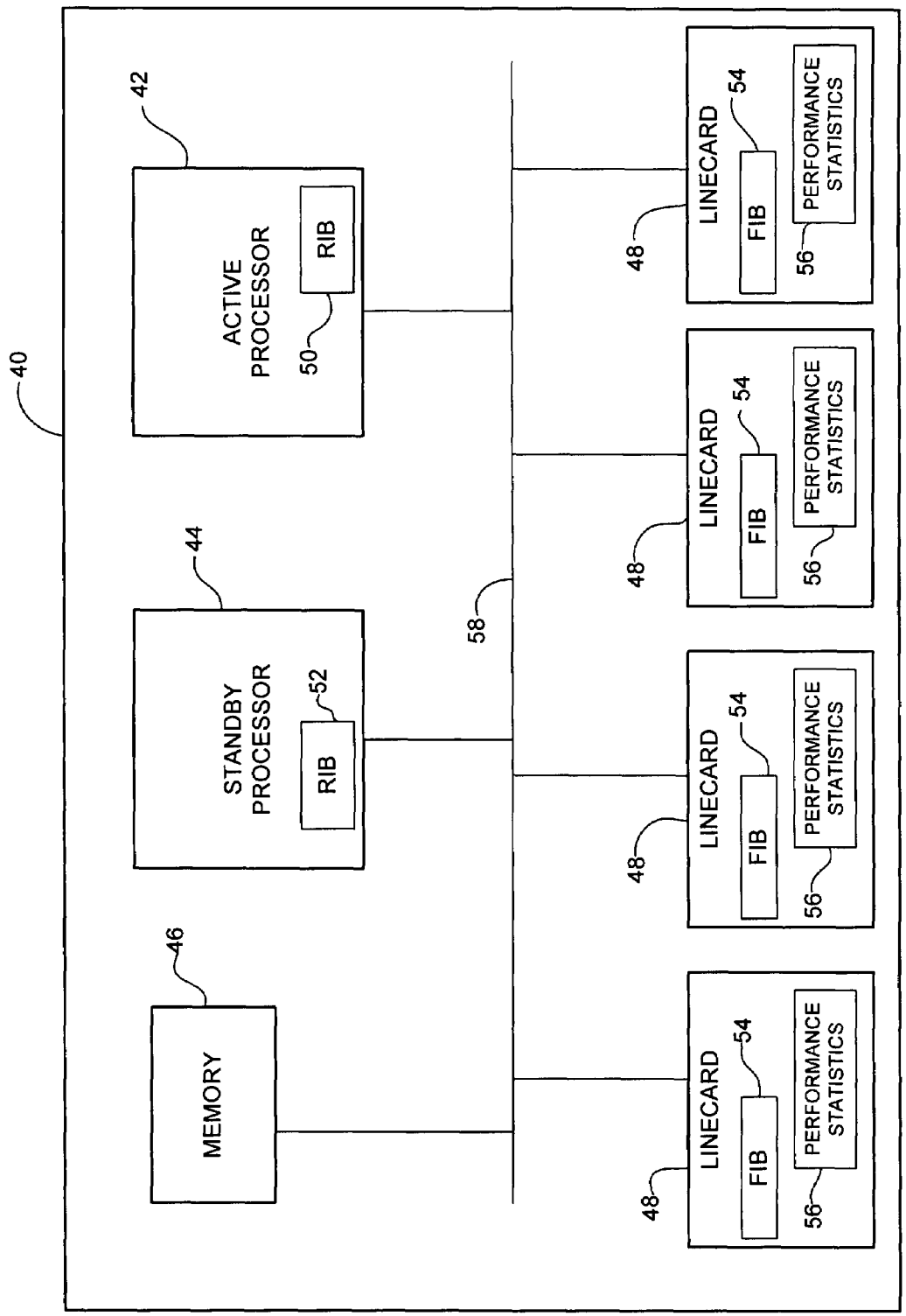
FIG. 2 illustrates an example of a network device of the network of FIG. 1.

FIG. 2 illustrates details of a network device 40 in accordance with one embodiment. Network device 40 is a programmable machine that may be implemented in hardware, software, or any combination thereof. One or more processors 42, 44 execute codes stored in a program memory 46. Program memory 46 is one example of a computer-readable medium. Program memory can be a volatile memory. Another form of computer-readable medium storing the same codes or other data structures would be some type of non-volatile storage such as floppy disks, CD-ROMs, DVD-ROMs, hard disks, flash memory, etc. In the embodiment shown in FIG. 2, the network device 40 includes an active route processor (primary processor) 42 and a standby route processor 44, each having an associated RIB 50, 52. The active processor 42 controls and runs routing protocols. The standby processor 44 is configured to take over functions of the primary processor when the primary processor experiences downtime.

In one embodiment, the network device 40 utilizes a distributed routing system in which linecards 48 store routing information and are attached to a network for communicating packets. Network device 40 interfaces with physical media via the linecards 48. The active and standby processors 42, 44 are connected to the linecards 48 through a bus (or other suitable connection) 58. Linecards 48 may incorporate Ethernet interfaces, DSL interfaces, Gigabit Ethernet interfaces, 10-Gigabit Ethernet interfaces, SONET interfaces, etc. To implement functionality according to the system, the linecards 48 incorporate processing and memory resources similar to those discussed above in connection with the network device as a whole. It is to be understood that the router may also be configured for centralized routing, wherein there is only one FIB located at a supervisor and all of the linecards perform a lookup in the central FIB.

In the embodiment shown in FIG. 2, forwarding information base 54 is copied to each linecard 48 on the network device 40. This allows the destination address/network prefix lookup to be performed on the interface or linecard, unloading the router's central processing unit (e.g., active route processor 42 or standby route processor 44). In the embodiment shown in FIG. 2, performance statistics 56 are also stored on the linecards 48. The data statistics are preferably stored in non-volatile memory.

It is to be understood that the network and network devices shown in FIGS. 1 and 2 are only examples, and the system and method described herein may be implemented on different networks and network devices without departing from the scope of the invention. For example, the embodiments may be implemented on a network device comprising any number of route processors, RIBs, or FIBs, including a network device comprising only one route processor, one RIB, and one FIB.

Performance statistics 56 are used by the RIB 50, 52 to select or modify repopulation priorities. In one embodiment the performance statistics are maintained in the FIB 54. It is to be understood that the performance statistics 56 may be maintained on the linecards 48 or any other location in the network device 40. The statistics 56 are preferably maintained in persistent storage so that the statistics are not lost following an event that clears or stales entries in the FIB (e.g., reload, active processor fail, software reboot, clearing of RIB, etc.). For a router with a single processor, the performance statistics may be maintained in persistent storage separate from the RIB and FIB, which may be cleared during a software reboot, for example, without emptying the performance statistics data structure.

During normal operation, the forwarding information base 54 maintains real-time performance statistics including indicators of route stability, such as persistence and number of packets forwarded per-route. In one embodiment, data is collected per-prefix, per-next-hop for the packets-per-route count. The statistics preferably include frequency and age for each route. It is to be understood that the term route as used herein to refer to an entry or identifier may include a prefix, next-hop, destination address, or any combination thereof. Data may also be aggregated for a set of routes sharing the same next-hop and covered by a common less-specific prefix.

The following is an example of a performance data entry according to one embodiment:

| ROUTE | FREQUENCY | AGE |
|---|---|---|

As noted above the route may be a prefix, next-hop or both prefix and next-hop. In one embodiment, a counter or other mechanism tracks how many packets are forwarded for each route in the forwarding information base 54. The frequency data may be number of packets over a time period or amount of data (e.g., bit/second) for example. The data is preferably time-stamped so that it can be weighted based on age. The age of the data can then be used when considering the data for route repopulation prioritization. In one embodiment, only the top most recently high traffic routes are maintained in storage. For example, at periodic intervals, all data other than statistics for the top 10% high usage routes may be deleted. The most important routes are thus identified in terms of usage and age. The stored statistics are dynamic and constantly updated as traffic is forwarded from the network device.

The collected performance data 56 is used to prioritize the routes to assist the routing information base 50, 52 in determining the order in which to propagate routes to the forwarding information base 54. For example, the RIB may use the performance data to assign a number indicating priority of the route, to each route or a portion of the routes in the RIB. The numbers may be assigned individually to each route or to a group of routes. For example, the RIB may assign a priority number to a group of routes that has received hits above a certain threshold within a specified time period, or the RIB may assign a different priority number (ranking) to each entry. As noted above, the performance data may only be retained for a top percentage of recently busy routes. Thus, one or more routes may have no performance data. The RIB may group these routes and assign a low priority number to them.

One or more prioritization rules are used by the RIB 50, 52 to prioritize the routes. The prioritization rules may place high priority on long-lived routes and high-volume routes, for example. In one embodiment, the entries with the highest priority are those that are most often and most recently used. It is these high priority routes that are repopulated first at the forwarding information base 54. The prioritization rules provide guidance for the routing information base 50, 52 to use either in ordering the delivery of existing RIB entries to the FIB 54, or in applying a delay (inversely proportional to priority) to routes as they are received by the RIB from routing protocols so that higher priority routes can first be propagated to the forwarding information base 54 during FIB recovery.

In addition to the performance statistics, the RIB may also use other information available to the RIB (e.g., stored at the RIB or other memory in the router) to prioritize routes for repopulation of the FIB. For example, prioritization of routes for repopulation may also be based on the type of route, e.g., source of route (internal route preferred over exterior route), prefix length (longer prefix preferred), static or dynamic route (static and connected route preferred over derived route, etc.) or route metric (e.g., administrative distance (smaller distance preferred over longer distance)). This route information is referred to as static route information since it typically does not change with the forwarding of packets, as does the dynamic performance statistics.

The combination of real-time dynamic measures of route behavior gathered in the forwarding information base 54 with static route information to determine route priority allows the most stable and well used routes to appear as promptly as possible in the forwarding information base. Thereby, diminishing the amount of misforwarding behavior the recovering router would otherwise display.

The use of performance statistics prevents inadvertent deficiencies that may result from using purely static route information. For example, a rule to prioritize an IGP's (Interior Gateway Protocol's) own routes ahead of any redistributed routes may result in a high-volume, redistributed route being delayed by less consequential routes. When real-time performance statistics is available, this data can be factored into the prioritization decision in such a way as to make a valuable exception to prioritization rules based on static route information.

As noted above, low priority routes may be delayed in being propagated to the forwarding information base 54 so that higher priority routes can be repopulated first. The delay may be based on prioritization of the routes according to the collected performance statistics, based on static route information available to the RIB, or a combination thereof. In one embodiment, the performance statistics are used to prioritize routes while other route information is used to delay one or more routes. For example, routes with low utilization statistics but higher administrative priority may be delayed in the repopulation to allow routes with high utilization statistics but lower administrative priority to get repopulated first. The delaying of routes based on static route information may also be used without prioritization based on performance statistics in the case where the performance data has been lost (e.g., restart of router after a period of time (e.g., >three minutes)) and the performance statistics are no longer fresh.

The above description refers to repopulation of an entire cleared or stale forwarding information base 54. It is to be understood that the system and method may also be used to repopulate only a portion of an FIB in cases where only certain entries in the FIB are deleted or stale. Repopulation is performed by prioritizing only the routes that need to be updated in the FIB 54.

The system and method described herein may also be used to prevent flapping of high-volume/long lived routes that may occur as a result of routing protocol re-convergence dynamics. For example, when an update is seen for a route for which both performance statistics and next-hop information is available, it may be decided to delay the route if the next-hop it specifies is not the same as the one on record and the source of the update is not authoritative. Thus, the use of performance statistics in FIB repopulation includes use of the data in FIB updates.

Figure 3:
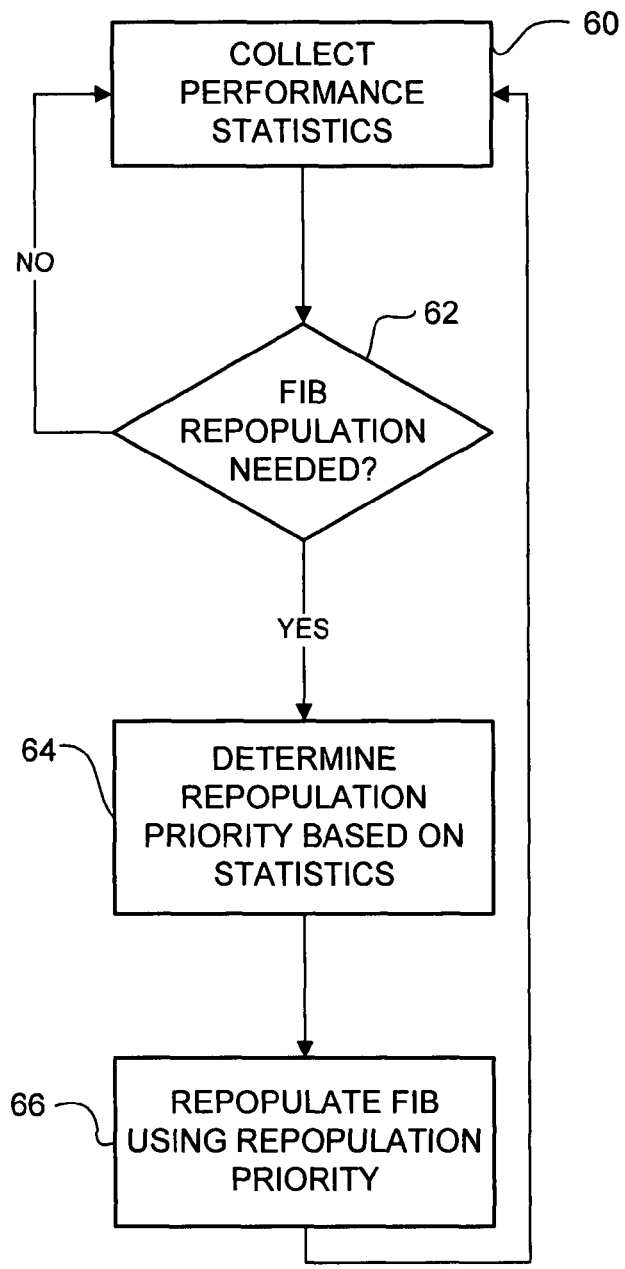
FIG. 3 is a flowchart illustrating one example of a process for repopulating a forwarding information base.

FIG. 3 is a flowchart illustrating a process for repopulating a forwarding information base in accordance with one embodiment. At step 60 performance statistics are collected. Details of step 60 are described below with respect to FIG. 4. If it is determined that FIB repopulation is needed (step 62), the repopulation priority is determined based on the collected statistics (step 64). Any number of events may result in a determination that the FIB is stale or empty and needs to be repopulated or one or more entries need to be repopulated (updated). For example, if the RIB is cleared and rebuilt (following a reload, software reboot, etc.), the FIB will need to be repopulated. In a router that supports high availability (HA), after switchover, the existing FIB entries are considered stale and need to be refreshed (FIB repopulated).

Once the secondary route processor comes online, the router processes received routing messages and constructs the RIB. The RIB collects statistics from the data structures or counters at the linecards containing the performance statistics. The routing information base uses this information to identify the order in which to repopulate the FIB (step 64). The RIB may assign each route or only a portion of the routes a number, for example, to prioritize the route based on the collected performance data. The RIB then repopulates the FIB based at least in part on the repopulation priority identified by the collected performance statistics (step 66). As discussed above, other factors such as whether a route is local or remote, resolved or unresolved, static and connected or derived, may also be used to determine the order in which the FIB is repopulated.

Figure 4:
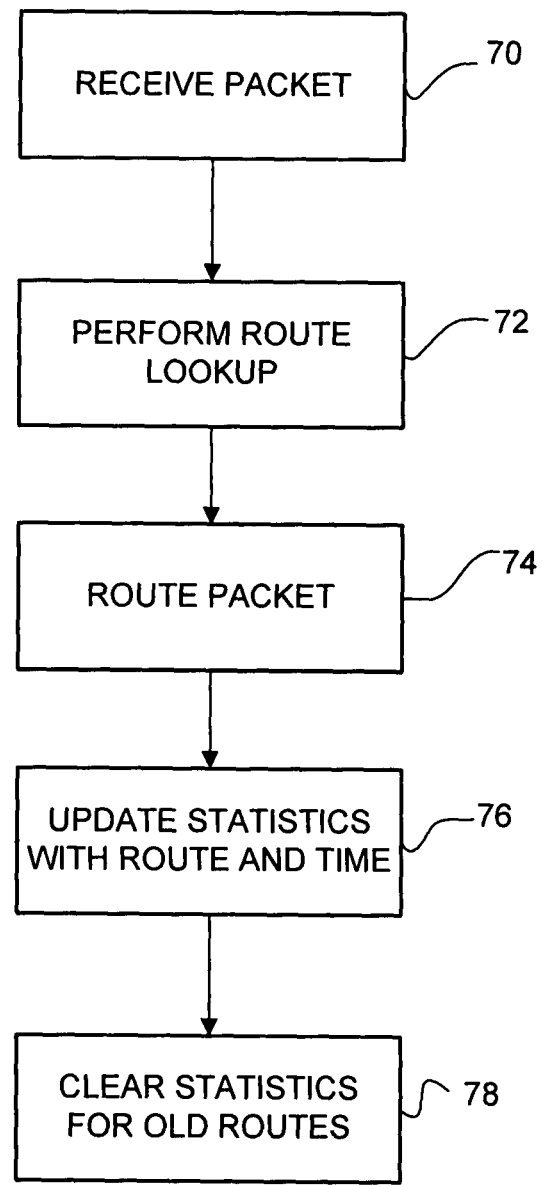
FIG. 4 is a flowchart illustrating details of a process for collecting performance characteristics, in accordance with one embodiment.

FIG. 4 illustrates details of a process for collecting performance statistics, in accordance with one embodiment. Processing begins at step 70 wherein a routing request or packet is received at the network device. A route lookup operation is performed at step 72. The route is identified and the packet is routed (step 74). The statistic corresponding to the accessed routing information is updated (step 76). The update is preferably time stamped so that old routes that have not been recently accessed can be cleared from the stored performance statistics (step 78).

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for repopulating a forwarding information base at a network device, the method comprising:
   collecting performance data at the network device based on number of packets forwarded per route from the network device, the performance data indicating route stability and comprising frequency of packets forwarded and an age associated with said frequency;
   prioritizing said routes in a routing information base based on said collected performance data; and
   propagating said routes to the forwarding information base in an order based at least in part on said prioritization of said routes.

2. The method of claim 1 wherein propagating said routes comprises propagating said routes to the forwarding information base in an order based on said prioritization and route metrics.

3. The method of claim 1 wherein propagating said routes comprises propagating said routes to the forwarding information base in an order based on said prioritization and type of routes.

4. The method of claim 1 further comprising delaying propagating one or more of said routes based on a metric associated with said route.

5. The method of claim 1 further comprising identifying occurrence of an event that results in a need to repopulate the forwarding information base.

6. The method of claim 5 wherein said event comprises a clearing of the routing information base.

7. The method of claim 5 wherein said event comprises switching over from an active processor to a standby processor at the network device.

8. The method of claim 5 wherein said event comprises rebooting at least a portion of the network device.

9. The method of claim 1 further comprising storing said collected performance data in persistent storage.

10. An apparatus for repopulating a forwarding information base, the apparatus comprising:
    a routing information base;
    a forwarding information base;
    memory for storing performance data based on number of packets forwarded per route from the apparatus and indicating route stability, the performance data comprising frequency of packets forwarded and an age associated with said frequency; and
    a processor configured to prioritize said routes stored in the routing information base based on said performance data, propagate said routes from the routing information base to the forwarding information base in an order based at least in part on said route priorities.

11. The apparatus of claim 10 wherein said memory comprises persistent storage.

12. The apparatus of claim 10 further comprising a counter for tracking the number of packets forwarded for each of said routes.

13. The apparatus of claim 10 further comprising a timestamp for indicating an age of said performance data.

14. The apparatus of claim 10 wherein the processor is configured to delay propagating one or more of said routes based on a metric associated with said route.

15. The apparatus of claim 10 wherein said order is based on said route priorities and route metrics.

16. The apparatus of claim 10 wherein said order is based on said route priorities and a type of routes.

17. An apparatus for repopulating a forwarding information base at a network device, the apparatus comprising:
    means for collecting performance data based on number of packets forwarded per route from the network device, the performance data indicating route stability and comprising frequency of packets forwarded and an age associated with said frequency;
    means for prioritizing said routes in a routing information base based on said collected performance data; and
    means for propagating said routes to the forwarding information base in an order based at least in part on said prioritization of said routes.

18. The apparatus of claim 17 further comprising means for identifying occurrence of an event that results in a need to repopulate the forwarding information base.

* * * * *